United States Patent
Ueno et al.

(10) Patent No.: US 11,455,068 B2
(45) Date of Patent: Sep. 27, 2022

(54) TOUCH PANEL HAVING INSULATING LAYER DISPOSED BETWEEN ELECTRODE PLATES WITH RESPECTIVE CONDUCTIVE FILMS THAT CONTACT FROM PRESSING FORCE

(71) Applicant: Fujitsu Component Limited, Tokyo (JP)

(72) Inventors: Yutaka Ueno, Tokyo (JP); Satoshi Sakurai, Tokyo (JP); Tatsuro Hamano, Tokyo (JP); Masahiko Katayama, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/556,355

(22) Filed: Aug. 30, 2019

(65) Prior Publication Data
US 2020/0097110 A1 Mar. 26, 2020

(30) Foreign Application Priority Data
Sep. 21, 2018 (JP) .............................. JP2018-178117

(51) Int. Cl.
*G06F 3/044* (2006.01)
*G06F 3/045* (2006.01)

(52) U.S. Cl.
CPC .................................. *G06F 3/045* (2013.01)

(58) Field of Classification Search
CPC .............................. G06F 1/169–1692; G06F 2203/04101–04114; G06F 3/03547; G06F 3/0393; G06F 3/041–0414
See application file for complete search history.

(56) References Cited

U.S. PATENT DOCUMENTS

| | | | |
|---|---|---|---|
| 10,185,427 B2 | 1/2019 | Hsieh | |
| 2006/0105152 A1* | 5/2006 | Cok | G06F 3/045 428/209 |
| 2007/0085837 A1* | 4/2007 | Ricks | G06F 3/045 345/173 |
| 2012/0091990 A1* | 4/2012 | Tsukada | G06F 3/047 324/76.11 |
| 2017/0220168 A1* | 8/2017 | Zhao | G06F 3/044 |
| 2018/0299997 A1* | 10/2018 | Isaacson | G06F 3/04144 |
| 2019/0155423 A1* | 5/2019 | Nakajima | G06F 3/02 |

FOREIGN PATENT DOCUMENTS

| | | |
|---|---|---|
| JP | H1115598 A | 1/1999 |
| JP | 2004-086626 A | 3/2004 |
| JP | 2012203701 A | 10/2012 |
| JP | 2017532654 A | 11/2017 |

\* cited by examiner

*Primary Examiner* — Sanghyuk Park
(74) *Attorney, Agent, or Firm* — Shumaker & Sieffert, P.A.

(57) ABSTRACT

A touch panel including a first electrode plate having a first conductive film, a second electrode plate having a second conductive film facing the first conductive film, an insulating layer disposed between the first electrode plate and the second electrode plate and having an opening, and a touch plate having a pressing member disposed at a position corresponding to the opening. The pressing member transmits pressing force applied to the touch plate to the second electrode plate, to bring the second conductive film into contact with the first conductive film.

6 Claims, 3 Drawing Sheets

TOUCH PANEL HAVING INSULATING LAYER DISPOSED BETWEEN ELECTRODE PLATES WITH RESPECTIVE CONDUCTIVE FILMS THAT CONTACT FROM PRESSING FORCE

CROSS-REFERENCE TO RELATED APPLICATIONS

This application is based upon and claims the benefit of priority of the prior Japanese Patent Application No. 2018-178117, filed Sep. 21, 2018, the entire contents of which are incorporated herein by reference.

TECHNICAL FIELD

The present disclosure relates to a resistive film touch panel.

BACKGROUND

In a resistive film touch panel, dot spacers are arranged at uniform intervals on a substrate with an ITO (Indium Tin Oxide) layer, and a film is disposed above the substrate and the dot spacers. Another ITO layer opposite to the substrate-side ITO layer is provided on the film. The dot spacers are provided so as to prevent erroneous contact between the opposing ITO layers due to external factors. When a user presses the film with a finger, the film-side ITO layer contacts the substrate-side ITO layer, whereby the coordinate information of the contact point is input. JP 2017-532654A and JP 2012-203701A disclose a touch panel using a transparent electrode layer.

SUMMARY

In a conventional resistive touch panel, a trapped air layer and dot spacers are present between the substrate and the film. Thus, unlike a capacitive touch panel, it is necessary to push the film by a certain distance while applying a load to the film. An inputting operation with a light load can be realized by reducing the size of the dot spacers or increasing the pitch between the dot spacers. However, there is a limit to the reduction of the size of the dot spacers, and if the pitch is made too large, the substrate-side ITO layer and the film-side ITO layer may come into contact with each other even when a screen is not touched.

According to one aspect, a touch panel is provided. The touch panel includes a first electrode plate having a first conductive film, a second electrode plate having a second conductive film facing the first conductive film, an insulating layer disposed between the first electrode plate and the second electrode plate and having an opening, and a touch plate having a pressing member disposed at a position corresponding to the opening. The pressing member transmits pressing force applied to the touch plate to the second electrode plate, to bring the second conductive film into contact with the first conductive film.

According to another aspect, a touch panel is provided. The touch panel includes a first electrode plate having a first conductive film; a second electrode plate having a second conductive film on a surface facing the first conductive film; an insulating layer disposed between the first electrode plate and the second electrode plate so as to be in contact with both the first conductive film and the second conductive film; a touch plate disposed above the second electrode plate; and a pressing member disposed between the second electrode plate and the touch plate at a position where the insulating layer is not formed. The pressing member transmits pressing force applied to the touch plate to the second electrode plate, and to bring the second conductive film into contact with the first conductive film.

In a resistive film touch panel, an inputting operation with a light load can be realized.

DETAILED DESCRIPTION

Figure 1:
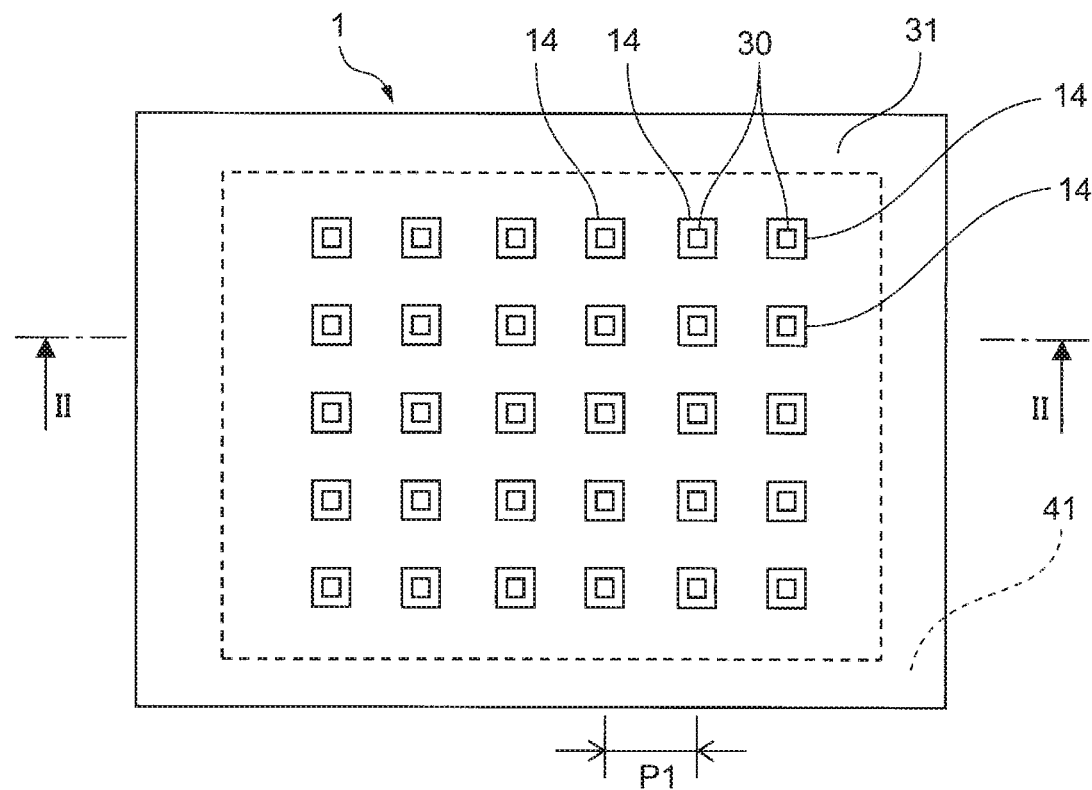
FIG. 1 is a plan view of a resistive film touch panel according to a first embodiment.

Embodiments of the present application will be described below in detail based on specific examples with reference to the accompanying drawings. In the following embodiments, the same or similar elements are denoted by the same reference numerals, and the drawings are scaled appropriately in order to facilitate understanding.

First Embodiment

A touch panel 1 of the present embodiment is a resistive film touch panel, and is used attached to a monitor of, for example, a personal computer or a mobile phone. In the following description, the direction indicated by the upward arrow in FIG. 2 is expressed as "up", and the direction indicated by the downward arrow in FIG. 2 is expressed as "down".

Figure 2:
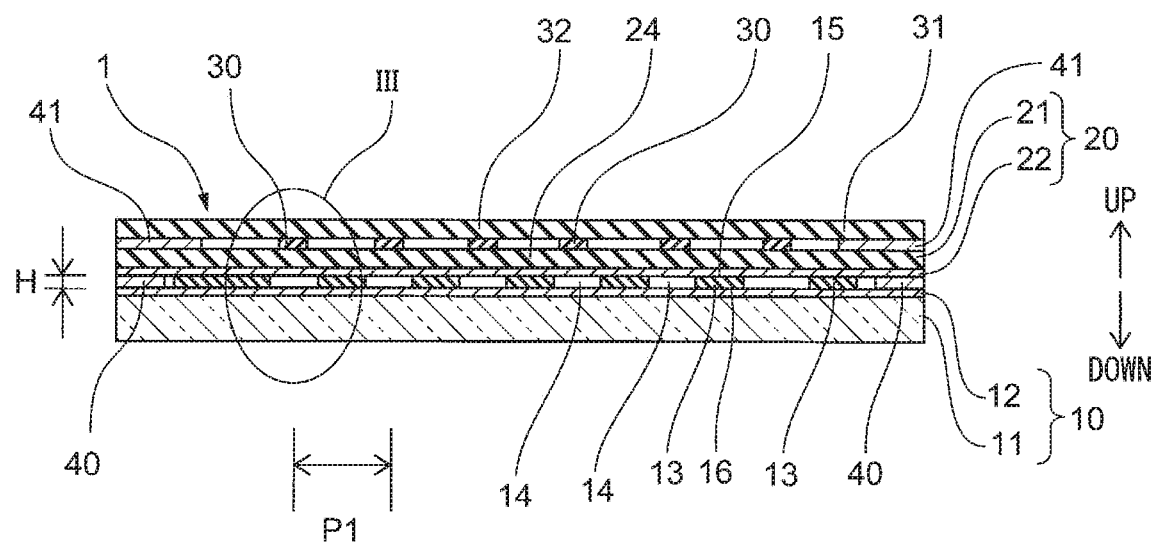
FIG. 2 is a sectional view taken along the line II-II in FIG. 1.
Figure 3:
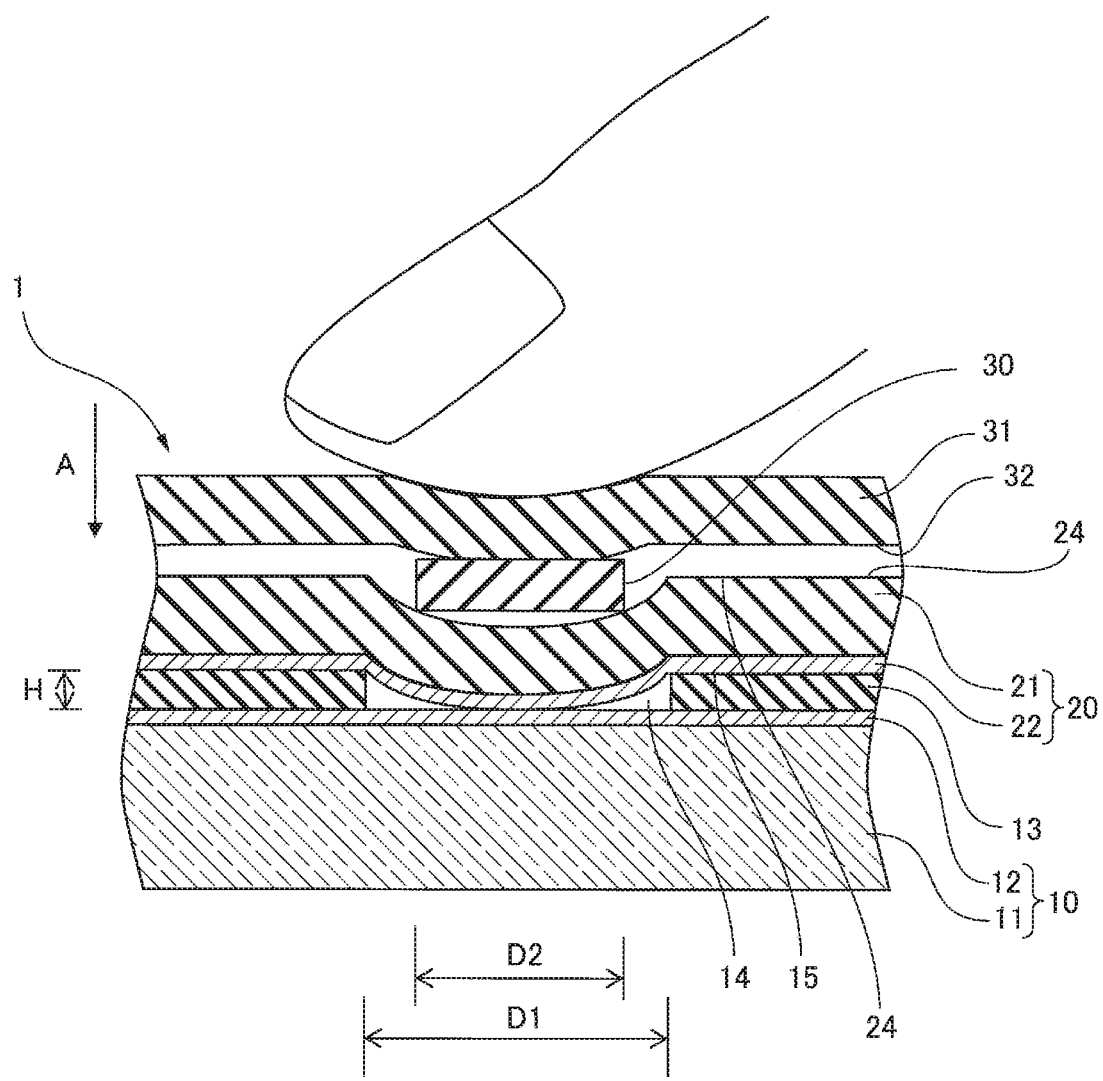
FIG. 3 is an enlarged sectional view of the touch panel when an operation screen is pressed.

As illustrated in FIGS. 1 to 3, the touch panel 1 includes a first electrode plate 10 having an ITO layer 12 as a first conductive film, an insulating layer 13 disposed on the ITO layer 12, openings 14 formed in and penetrating through the insulating layer 13, and a second electrode plate 20 disposed on the insulating layer 13 and having an ITO layer 22 as a second conductive film opposite to the ITO layer 12. Further, the touch panel 1 includes pressing members 30 disposed on the second electrode plate 20 at positions corresponding to the openings 14, and a touch plate 31 disposed on the pressing members 30. As illustrated in FIG. 3, the pressing members 30 transmit pressing force applied to the touch plate 31 to the second electrode plate 20, to bring the ITO layer 22 into contact with the ITO layer 12 within each opening 14.

The first electrode plate 10 is obtained by disposing the ITO layer 12 on one surface of a glass substrate 11. The second electrode plate 20 is obtained by disposing the ITO layer 22 on one surface of a PET film 21. The first electrode plate 10 and the second electrode plate 20 are bonded to each other at ends of the first electrode plate 10 by a double-sided tape 40.

The insulating layer 13 is disposed between the first electrode plate 10 and the second electrode plate 20 on the surface of the first electrode plate 10 within a region surrounded by the tape 40. The upper surface 15 of the insulating layer 13 is in contact with the second electrode plate 20 and the lower surface 16 is in contact with the first electrode plate 10. There is no air layer between the insulating layer 13 and the ITO layer 22 and between the insulating layer 13 and the ITO layer 12.

As illustrated in FIGS. 1 and 2, openings 14 are formed in the insulating layer 13 with a uniform pitch P1. The ITO layer 12 and the ITO layer 22 are exposed at the position of the openings 14 penetrating the insulating layer 13, and only the exposed portions of the ITO layer 12 and the ITO layer 22 can contact with each other. At least one pressing member 30 is disposed at a position corresponding to each opening 14. As illustrated in FIG. 3, when the touch plate 31 is pressed by a user's finger in the direction A, the touch plate 31 is bent and the pressing member 30 moves downward in the direction A. The pressing member 30 transmits pressing force applied to the touch plate 31 to the second electrode plate 20, to bend the second electrode plate 20, so that the ITO layer 12 and the ITO layer 22 are brought into contact with each other within the opening 14. Thus, the ITO layer 12 and the ITO layer 22 are energized to input the coordinate information of the contact point.

The pressing members 30 are made of, for example, a transparent acrylic curable resin or a transparent adhesive material. The openings 14 and the pressing members 30 illustrated in FIG. 1 are formed to have a rectangular planar shape. However, the planar shape of the openings 14 and the pressing members 30 may be any other shape such as a circular shape or an oval shape.

The insulating layer 13 is formed of a transparent material. In the present embodiment, the insulating layer 13 provided between the ITO layer 22 and the ITO layer 12 prevents the ITO layer 22 and the ITO layer 12 from being accidentally brought into contact with each other. In a conventional touch panel, the PET film with the ITO layer is entirely bent by an input operation. Accordingly, the ITO layers need to be spaced 400 μm to 500 μm apart, for example, to prevent erroneous contact between the ITO layers. In the present embodiment, as illustrated in FIG. 3, only the portion of the second electrode plate 20 which corresponds to the opening 14 at the operated position can be bent, and accordingly, the distance H between ITO layer 22 and ITO layer 12 can be set to be 150 μm or less to prevent erroneous contact within the opening 14. In the present embodiment, it is possible to reduce the pressing distance needed to bring the ITO layers into contact with each other. Although the distance H is preferable to be small, it is also needed to prevent the ITO layer 22 and the ITO layer 12 which are exposed at each opening 14 from erroneously contacting with each other. Therefore, in the present embodiment, the distance H is set to be 3 μm or more.

The openings 14 illustrated in FIG. 1 are formed to have a rectangular shape. Considering that the second electrode plate 20 bends in each opening 14, each opening 14 is formed so that the length D1 of one side thereof is 10 μm or more and 3 mm or less. The pitch P1 at which the openings 14 are arranged can be determined according to the mode of operation. For example, in a touch panel used for an operation panel of a device, only the operation of selecting a button or the like displayed on the screen need to be taken into consideration. Therefore, the interval of coordinate to be acquired may be relatively large. It is preferable that at least one pressing member 30 is provided at a position of a button to be operated, and thus, the pressing members 30 may be formed at a pitch P1 of 10 mm. In contrast, when the coordinate information is continuously input to draw a line by using a tapered pen, it is preferable that the interval of the coordinate to be acquired is smaller, and thus, the pitch P1 is relatively small, for example, 0.5 mm when the touch panel is made so as to be compatible with pen input.

As illustrated in FIG. 1, the pressing members 30 are formed into a rectangular shape according to the shape of the openings 14, and one side D2 thereof is formed in a range of 5 or more and 2 mm or less in accordance with one side D1 of the openings 14.

The pressing members 30 may be formed of an acrylic curable resin. In this respect, the pressing members 30 are secured to the touch plate 31. The pressing members 30 may be secured to the touch plate 31 with an adhesive. When the pressing members 30 are made of an adhesive material, the pressing members 30 can be secured to both the second electrode plate 20 and the touch plate 31. In this respect, it is not needed to separately use an adhesive to secure the pressing members 30. The pressing members 30 may be formed on the second electrode plate 20.

When the pressing members 30 are formed of an acrylic curable resin, the liquid resin is printed on the touch plate 31 at a pitch P1 and then cured by irradiation with ultraviolet rays.

In the touch panel 1, alignment marks for aligning pressing members 30 with the openings 14 may be provided on the touch plate 31, the insulating layer 13, and the second electrode plate 20. The touch panel 1 can be assembled using the alignment marks for positioning.

The first electrode plate 10 and the insulating layer 13 are positioned by the alignment marks provided thereon, and then, the insulating layer 13 is laminated on the first electrode plate 10. The insulating layer 13 and the second electrode plate 20 are positioned by the alignment marks provided thereon, and then, the second electrode plate 20 is laminated on the insulating layer 13. The second electrode plate 20 and the touch plate 31 are positioned by the alignment marks provided thereon, and then, the touch plate 31 is laminated on the second electrode plate 20. In this way, the touch panel 1 can be assembled so that the pressing members 30 align with the openings 14.

When the pressing members 30 are formed of an adhesive material, the liquid adhesive material is arranged, by printing, on the touch plate 31 at a pitch P1.

The second electrode plate 20 may include a film substrate having a surface subjected to an Anti Newton-Ring (ANR) treatment, on which the ITO layer 22 is formed. Fine irregularities may be formed on the surface of the film substrate as an ANR treatment. The occurrence of interference fringes such as Newton rings is prevented by the ANR treatment, and the visibility of the screen is improved.

When the pressing members 30 are made of an acrylic curable resin, the pressing members 30 and the second electrode plate 20 are not bonded to each other. Thus, even when the touch plate 31 is not pressed, a gap may be formed between the electrode plate 20 and the pressing members 30 due to the influence of temperature or the like. When the gap is formed and the distance between the second electrode plate 20 and the touch plate 31 changes, interference fringes such as Newton rings may occur. Therefore, in order to prevent the interference fringes, the ANR treatment may be performed as a surface treatment for the inner surface 32 of the touch plate 31 facing the pressing members 30 or the surface 24 of the second electrode plate 20. On the other hand, when the pressing members 30 are formed of an adhesive material, the pressing members 30 adhere to both the second electrode plate 20 and the touch plate 31. Thus, gaps are hardly formed between the touch plate 31 or the second electrode plate 20 and the pressing members 30. Thus, the ANR treatment on the surface 24 facing the pressing members 30 and the inside surface 32 is not needed, and these surfaces may be clear surfaces.

In the touch panel 1 of the present embodiment, the ITO layer 12 and the ITO layer 22 only contact with each other at a portion in which the ITO layer 22 is exposed in an opening 14. Further, the second electrode plate 20 is bent at the position of the openings 14. This reduces the pressing distance H for bringing the ITO layers into contact with each other. The insulating layer 13 is disposed between the ITO layer 12 and the ITO layer 22 so as to eliminate an air layer. This reduces the resistance due to the air pressure during an operation. Furthermore, the second electrode plate 20 is pressed via the pressing members 30, and thus, the pressing members 30 are concentrically loaded. As a result, the pressure for bending the second electrode plate 20 can be increased. Therefore, the user can input with a light load while maintaining the superiority of the resistive film touch panel, such that it is possible to input with not only a finger but also a gloved finger or a pen. Thus, an operation feeling close to that of the capacitive touch panel can be obtained.

Second Embodiment

Figure 4:
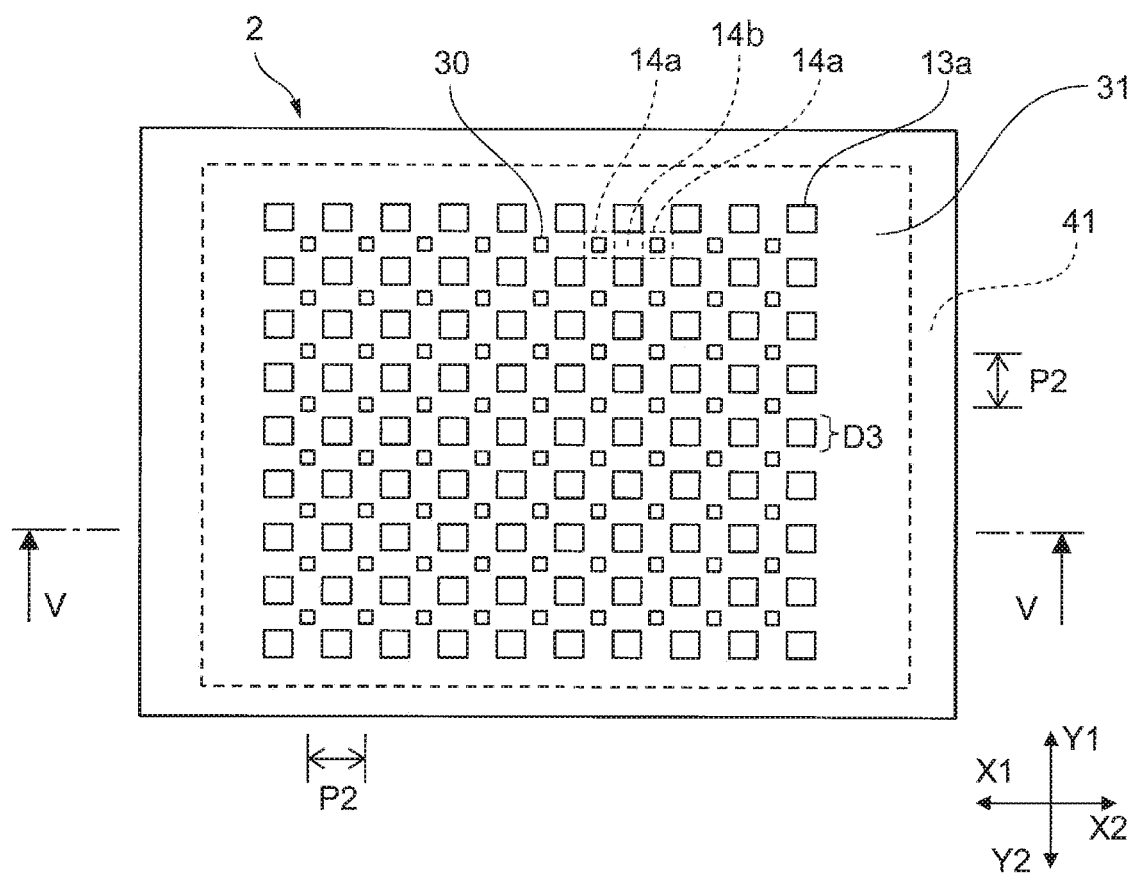
FIG. 4 is a plan view of a resistive film touch panel according to a second embodiment.

FIG. 4 illustrates a resistive film touch panel 2 according to a second embodiment. The touch panel 2 differs from the touch panel 1 in the configuration of the insulating layer 13a. The description of the same components as those of the first embodiment will be omitted.

The touch panel 2 includes a first electrode plate 10 having an ITO layer 12 as a first conductive film, a second electrode plate 20 having an ITO layer 22 as a second conductive film on a surface facing the ITO layer 12, an insulating layer 13a disposed between the first electrode plate 10 and the second electrode plate 20 so as to be in contact with both the ITO layer 12 and the ITO layer 22, a touch plate 31 disposed above the second electrode plate 20, and pressing members 30 disposed between the second electrode plate 20 and the touch plate 31 at positions where the insulating layer 13a is not formed. The pressing members 30 transmit pressing force to be applied to the touch plate 31 to the second electrode plate 20, to bend the second electrode plate 20, and to bring the ITO layer 22 into contact with the ITO layer 12.

Figure 5:
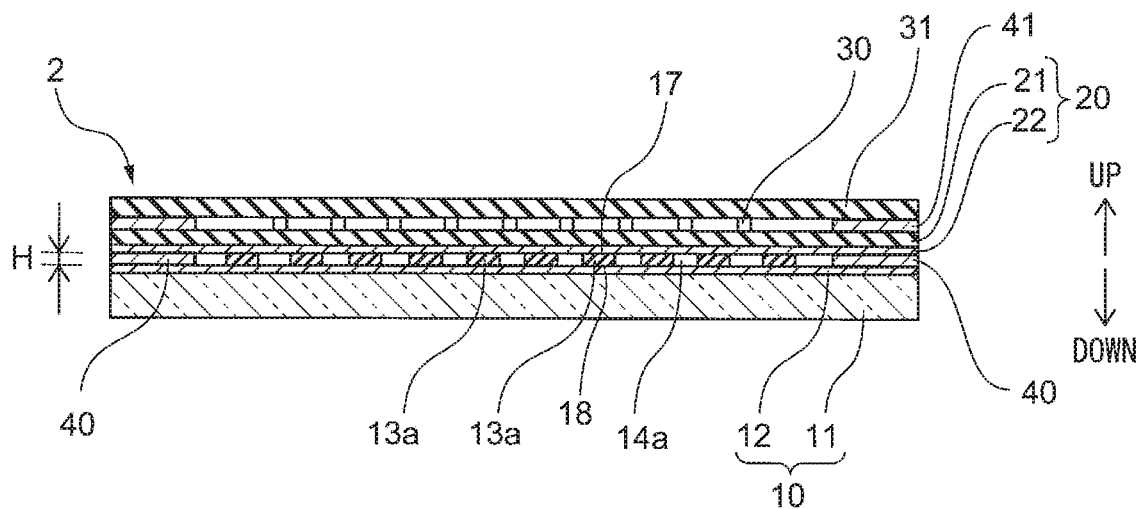
FIG. 5 is a sectional view taken along the line V-V in FIG. 4.

As illustrated in FIGS. 4 and 5, the insulating layer 13a is formed as protrusions disposed on the ITO layer 12 in a dispersed manner. The insulating layer 13a may be formed of an insulating transparent material in a rectangular shape. The insulating layer 13a is disposed between the first electrode plate 10 and the second electrode plate 20. As illustrated in FIG. 4, the region where the insulating layer 13a is not formed is a lattice-shaped communicating space, and includes first openings 14a corresponding to the intersections of the lattice and second openings 14b corresponding to parallel lines of the lattice. At least one pressing member 30 is disposed between the second electrode plate 20 and the touch plate 31 at a position corresponding to the opening 14a where the insulating layer 13a is not formed. The pressing members 30 may be formed of a transparent acrylic curable resin or a transparent adhesive in a rectangular shape. The planar shape of the insulating layer 13a and the pressing members 30 may be formed in other shapes such as a circular shape or an elliptical shape.

As illustrated in FIG. 5, the upper surface 17 of each protrusion is in contact with the second electrode plate 20, and the lower surface 18 of each protrusion is in contact with the first electrode plate 10. There is no air layer between the insulating layer 13a and the ITO layer 22 and between the insulating layer 13a and the ITO layer 12.

The pressing members 30 transmit pressing force to be applied to the touch plate 31 to the second electrode plate 20, to bend the second electrode plate 20, and to bring the ITO layer 12 and the ITO layer 22 into contact with each other within the openings 14a. Thus, the ITO layer 12 and the ITO layer 22 can be energized to input the coordinate information of the contact point.

As a lattice-shaped communicating space is formed between the protrusions of the insulating layer 13a, the second electrode plate 20 can bend even at the position of the space portions 14b when the pressing members 30 bend the second electrode plate 20 at the position of the openings 14a. Therefore, in the touch panel 2, the second electrode plate 20 can be bent by the pressing members 30 with a lighter load.

In order to input information including lines such as letters and figures using a pen in a touch panel, it is needed to acquire coordinate information at a finer interval, for example, a pitch of 0.5 mm. Acquisition of the coordinate information at fine intervals may be realized by reducing the pitch between the openings 14a, the pitch between the protrusions of the insulating layer 13a, and the pitch P2 between the pressing members 30.

In the touch panel 2, the ITO layer 12 and the ITO layer 22 only contact with each other at a portion in which the ITO layer 22 is exposed in an opening 14. Further, the second electrode plate 20 is bent at the position of the openings 14. This reduces the pressing distance H for bringing the ITO layers into contact with each other. The insulating layer 13a is disposed between the ITO layer 12 and the ITO layer 22 so as to eliminate an air layer. This reduces the resistance due to the air pressure during an operation. Furthermore, the second electrode plate 20 is pressed via the pressing members 30, and thus, the pressing members 30 are concentrically loaded. As a result, the pressure for bending the second electrode plate 20 can be increased. Therefore, the user can input with a light load while maintaining the superiority of the resistive film touch panel, such that it is possible to input with not only a finger but also a gloved finger or a pen. Thus, an operation feeling close to that of the capacitive touch panel can be obtained.

The invention claimed is:

1. A touch panel comprising:
   a first electrode plate having a first conductive film formed on a surface of the first electrode plate;
   a second electrode plate having a second conductive film formed on a first surface of the second electrode plate facing the first conductive film;
   a transparent insulating layer disposed between the first electrode plate and the second electrode plate and having an opening through which the first conductive film and the second conductive film can contact;
   an adhesive that bonds the first electrode plate and the second electrode plate at ends of the first electrode plate;
   a touch plate provided over a second surface of the second electrode plate opposite to the first surface; and
   a pressing member disposed between the touch plate and the second electrode plate at a position corresponding to the opening, a portion of the touch plate in which the pressing member is not provided is spaced apart from the second electrode plate,
   wherein the touch plate is placed over the second electrode plate and the pressing member, wherein when the touch plate is pressed, the pressing member transmits pressing force applied to the touch plate to the second electrode plate, to bring the second conductive film into contact with the first conductive film through the opening, and wherein the width of the pressing member is smaller than the width of the opening, and the width of the opening is smaller than the distance between the adhesive on the opposite ends of the first electrode plate.

2. The touch panel according to claim 1, wherein the insulating layer has a plurality of the openings and the opening is one of the plurality of openings, and at least one pressing member is disposed at a position corresponding to each opening.

3. The touch panel according to claim 2, wherein adjacent openings can communicate with one another through a space between the adjacent openings, the space being a portion in which no insulating layer is provided between the first electrode plate and the second electrode plate.

4. The touch panel of claim 1, wherein the touch plate cover an entire surface of the touch panel.

5. A touch panel comprising:
a first electrode plate having a first conductive film formed on a surface of the first electrode plate;
a second electrode plate having a second conductive film formed on a first surface of the second electrode plate facing the first conductive film;
a transparent insulating layer disposed between the first electrode plate and the second electrode plate so as to be in contact with both the first conductive film and the second conductive film;
an adhesive that bonds the first electrode plate and the second electrode plate at ends of the first electrode plate;
a touch plate disposed over a second surface of the second electrode plate opposite to the first surface; and
a pressing member disposed between the second electrode plate and the touch plate at a position where the insulating layer is not formed, a portion of the touch plate in which the pressing member is not provided is spaced apart from the second electrode plate,
wherein the pressing member transmits pressing force applied to the touch plate to the second electrode plate, and to bring the second conductive film into contact with the first conductive film at the position where the insulating layer is not formed, and wherein the width of the pressing member is smaller than the width of the opening, and the width of the opening is smaller than the distance between the adhesive on the opposite ends of the first electrode plate.

6. The touch panel of claim 5, wherein the touch plate cover an entire surface of the touch panel.

* * * * *